United States Patent
Zenou et al.

(10) Patent No.: US 11,440,241 B2
(45) Date of Patent: Sep. 13, 2022

(54) ADDITIVE MANUFACTURING OF A FREE FORM OBJECT MADE OF MULTICOMPONENT MATERIALS

(71) Applicant: IO Tech Group Ltd., London (GB)

(72) Inventors: Michael Zenou, Hashmonaim (IL); Guy Nesher, Nes Ziona (IL)

(73) Assignee: IO Tech Group Ltd., London (GB)

( * ) Notice: Subject to any disclaimer, the term of this patent is extended or adjusted under 35 U.S.C. 154(b) by 219 days.

(21) Appl. No.: 15/929,706

(22) Filed: May 18, 2020

(65) Prior Publication Data

US 2020/0391433 A1 Dec. 17, 2020

Related U.S. Application Data

(60) Provisional application No. 62/861,548, filed on Jun. 14, 2019.

(51) Int. Cl.
 *B29C 64/112* (2017.01)
 *B33Y 10/00* (2015.01)
 (Continued)

(52) U.S. Cl.
 CPC ............ *B29C 64/112* (2017.08); *B29C 64/40* (2017.08); *B33Y 10/00* (2014.12); *B33Y 70/00* (2014.12); *C08L 63/00* (2013.01); *C08L 75/04* (2013.01); *C08L 83/04* (2013.01); *B29K 2063/00* (2013.01); *B29K 2075/00* (2013.01);
 (Continued)

(58) Field of Classification Search
 CPC ...... B29C 64/112; B29C 64/106; B20C 64/40
 See application file for complete search history.

(56) References Cited

U.S. PATENT DOCUMENTS

| 4,477,626 A | 10/1984 | Suzuki |
| 5,204,055 A | 4/1993 | Sachs et al. |

(Continued)

FOREIGN PATENT DOCUMENTS

| WO | 2011/107599 A1 | 9/2011 |
| WO | 2014/078537 A1 | 5/2014 |

(Continued)

OTHER PUBLICATIONS

Pere Serra et al., "Laser-Induced Forward Transfer: Fundamentals and Applications," Advanced Material Technologies, vol. 4 (1), 1800099, first published on Aug. 8, 2018, available at https://onlinelibrary.wiley.com/doi/abs/10.1002/admt.201800099). (Year: 2018).*

(Continued)

*Primary Examiner* — Niki Bakhtiari
*Assistant Examiner* — Inja Song
(74) *Attorney, Agent, or Firm* — Ascenda Law Group, PC

(57) ABSTRACT

Manufacture of a 3D object by a printing method that enables the use of several reactive materials sequentially. A laser-enhanced jetting-based 3D printer forms successive layers of reactive compositions on one another and the first and subsequent layers are allowed to crosslink between the printings to ultimately form the 3D object. Additional reactive compositions may be printed prior to the crosslinking. The crosslinking may be effected by heating, with or without a catalyst, and post printing curing may be employed after the 3D object is formed.

18 Claims, 1 Drawing Sheet

(51) Int. Cl.

| | |
|---|---|
| *B33Y 70/00* | (2020.01) |
| *B29C 64/40* | (2017.01) |
| *C08L 63/00* | (2006.01) |
| *C08L 75/04* | (2006.01) |
| *C08L 83/04* | (2006.01) |
| *B29K 63/00* | (2006.01) |
| *B29K 75/00* | (2006.01) |
| *B29K 83/00* | (2006.01) |
| *B29K 105/00* | (2006.01) |
| *B29K 105/16* | (2006.01) |

(52) U.S. Cl.
 CPC .. *B29K 2083/00* (2013.01); *B29K 2105/0014* (2013.01); *B29K 2105/16* (2013.01); *B29K 2863/00* (2013.01); *B29K 2875/00* (2013.01)

(56) References Cited

U.S. PATENT DOCUMENTS

| | | | |
|---|---|---|---|
| 5,506,607 | A | 4/1996 | Sanders, Jr. et al. |
| 5,740,051 | A | 4/1998 | Sanders, Jr. et al. |
| 6,121,368 | A | 9/2000 | Heying et al. |
| 9,527,241 | B2 | 12/2016 | Levine et al. |
| 2005/0212888 | A1 | 9/2005 | Lehmann et al. |
| 2009/0074987 | A1 | 3/2009 | Auyeung et al. |
| 2010/0021638 | A1* | 1/2010 | Varanka ............... B29C 64/112 427/271 |
| 2011/0291326 | A1 | 12/2011 | Okamoto et al. |
| 2016/0233089 | A1 | 8/2016 | Zenou et al. |
| 2017/0189995 | A1 | 7/2017 | Zenou et al. |
| 2017/0320263 | A1* | 11/2017 | Guillemot ............ C12N 5/0654 |
| 2017/0365484 | A1* | 12/2017 | Kotler ..................... B22F 5/10 |
| 2018/0015502 | A1* | 1/2018 | Zenou ..................... B33Y 30/00 |
| 2018/0281276 | A1* | 10/2018 | Milroy .................. B29C 64/124 |
| 2018/0355199 | A1* | 12/2018 | Stasiak .................. C09D 11/38 |
| 2019/0176387 | A1* | 6/2019 | Kuno ....................... C08K 5/17 |
| 2019/0329488 | A1* | 10/2019 | Ravich ............... B29C 35/0805 |
| 2020/0102529 | A1* | 4/2020 | Guillemot ............. A61F 2/5044 |
| 2020/0130266 | A1* | 4/2020 | DeSimone ............. B33Y 40/00 |
| 2020/0384696 | A1* | 12/2020 | Hirata ..................... C08K 5/34 |
| 2021/0197268 | A1* | 7/2021 | Nauka .................... B22F 10/20 |

FOREIGN PATENT DOCUMENTS

| | | |
|---|---|---|
| WO | 2016/020817 A1 | 2/2016 |
| WO | 2017/044735 A1 | 3/2017 |
| WO | 2017/081028 A1 | 5/2017 |
| WO | 2017/121733 A1 | 7/2017 |
| WO | 2018/206689 A1 | 11/2018 |

OTHER PUBLICATIONS

International Search Report and Written Opinion dated Jul. 17, 2020, from the ISA/European Patent Office, for International Patent Application No. PCT/IB2020/054703 (filed May 18, 2020), 13 pgs.
International Preliminary Report on Patentability dated Oct. 20, 2021, from IPEA/European Patent Office, for International Patent Application No. PCT/IB2020/054703 (filed May 18, 2020), 12 pgs.
Written Opinion of the International Preliminary Examining Authority dated Jun. 16, 2021, from the IPEA/European Patent Office, for International Patent Application No. PCT/IB2020/054703 (filed May 18, 2020), 7 pgs.
Amendment (PCT Article 34) filed Apr. 12, 2021, for International Patent Application No. PCT/IB2020/054703 (filed May 18, 2020), 7 pgs.

* cited by examiner

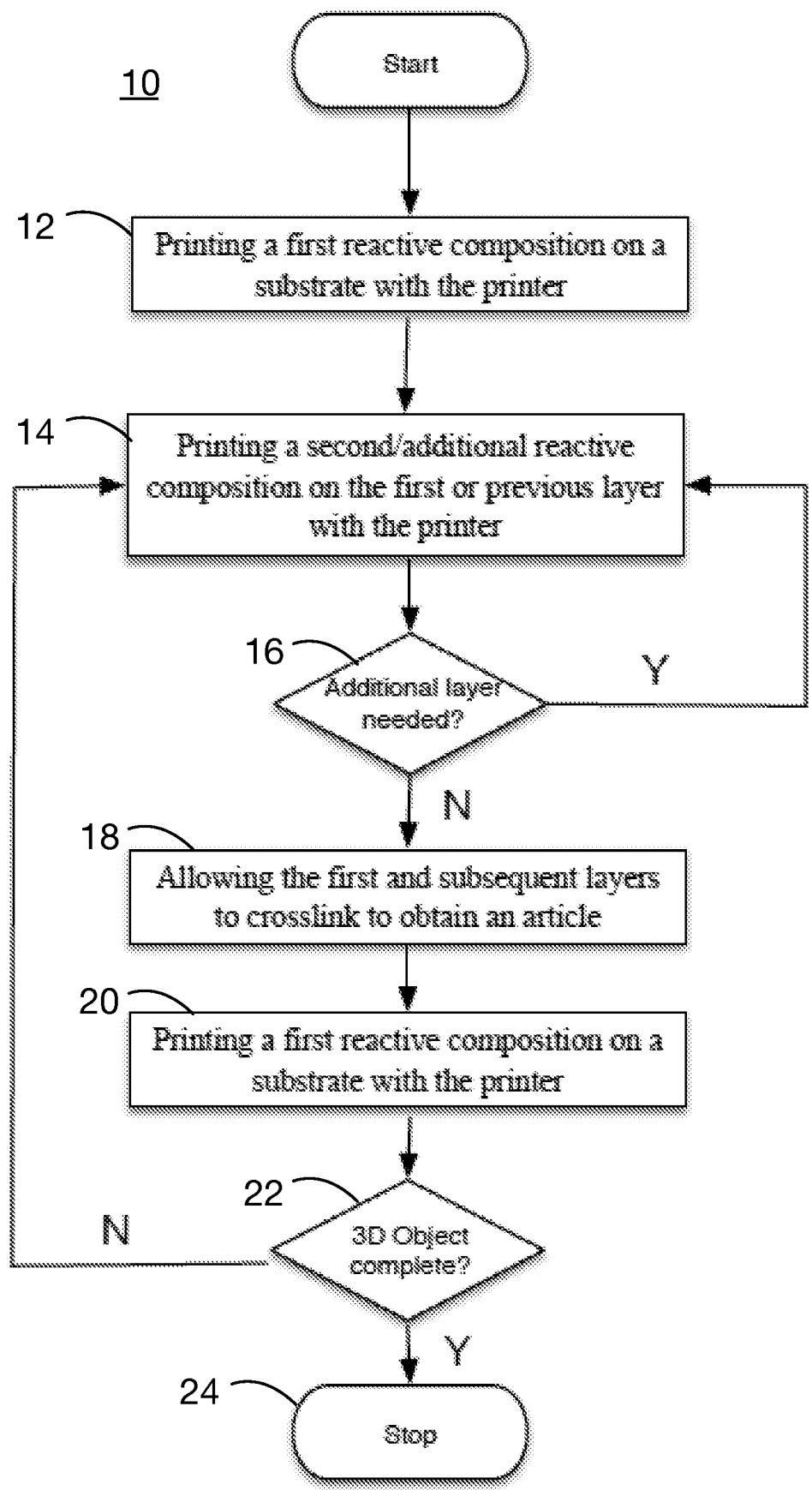

ADDITIVE MANUFACTURING OF A FREE FORM OBJECT MADE OF MULTICOMPONENT MATERIALS

RELATED APPLICATIONS

This application is a NONPROVISIONAL of, claims priority to, and incorporates by reference U.S. Provisional Application No. 62/861,548, filed 14 Jun. 2019.

FIELD OF THE INVENTION

The present invention relates to a method of forming an article and, more specifically, to a method of forming a three-dimensional (3D) article utilizing two or more reactive materials.

BACKGROUND

Conventional additive manufacturing (e.g., 3D printing) processes are limited to certain types of materials, such as organics (e.g., polylactic acid (PLA) or acrylonitriie butadiene styrene (ABS)), plaster, clay, room temperature vulcanization (RTV) materials, paper, or metal alloys. These materials are unsuitable in certain end applications based on physical or chemical limitations, including those relating to resistance to heat, moisture, radiation, and weathering, as well as concerns involving cost, slow solidification (or cure) times, improper viscosity, etc.

Among the current 3D printing methods are ink-jet printing technologies, liquid resin based systems, and others. Ink-jet printing technology can be used to fabricate 3D objects as described in Sachs et al., U.S. Pat. No. 5,204,055. In that example, printer heads are used to discharge a binder material onto a layer of powder particulate in a powder bed. The powdered layer corresponds to a digitally superposed section of the object that will be produced. The binder causes the powder particles to fuse together in selected areas. This results in a fused cross-sectional segment of the object being formed on the platform. The steps are repeated for each new layer until the desired object is achieved. In a final step, a laser beam scans the object causing the powdered layers to sinter and fuse together.

In another ink-jet printing process, as described in Sanders, U.S. Pat. Nos. 5,506,607 and 5,740,051, a low-melting thermoplastic material is dispensed through one ink-jet printing head to form a three-dimensional object. A second ink-jet printer head dispenses wax material to form supports for the three-dimensional object. After the object has been produced, the wax supports are removed, and the object is finished as needed.

Sun et al., WO 2014/078537A1, described a liquid resin system for fabricating 3D dental devices using Digital Light Processor (DLP) projectors or other light beam irradiations, such as stereolithography. In this method, a polymerizable liquid resin material or heated resin material such as a liquid is loaded into a resin bath of a 3D printer. In the case of the DLP method, it builds 3D objects by projecting sequential voxel planes into the liquid resin (or heated resin), which then polymerizes to solidify. Successive layers of polymerized material are added in this manner until the device is completely fabricated. Then the device is washed, finished and fully finally cured as needed.

Other known 3D printing processes include those using fused filament fabrication printers, selective laser sintering printers, selective laser melting printers, stereolithography printers, powder bed (binder jet) printers, material jet printers, direct metal laser sintering printers, electron beam melting printers, laminated object manufacturing deposition printers, directed energy deposition printers, laser powder forming printers, polyjet printers, ink-jetting printers, material jetting printers, and syringe extrusion printers. Only a few of these processes can print more than one material in each layer, and only a few are considered high accuracy methodologies. Common to all is that they can print materials only in a limited range of viscosities and in the methods that print one material on top of the other, the second material is applied with low momentum and, therefore, the mixing between the two materials is generally limited.

SUMMARY OF THE INVENTION

In one embodiment, the present invention provides a method for fabricating a three-dimensional (3D) object, which includes printing a first reactive composition on a substrate with a laser-enhanced jetting-based 3D printer to form a first layer of the 3D object; printing a second reactive composition on the first layer with said 3D printer to form a subsequent layer of the 3D object; allowing the first and subsequent layers to crosslink to obtain an article; and repeating these steps until the 3D object is formed. In some embodiments, additional reactive compositions may be printed on the first layer prior to allowing the first and subsequent layers to crosslink. Optionally, the first and subsequent layers may be crosslinked by heating, with or without a catalyst such as platinum group metal or compound. Post printing curing may be employed after the 3D object is formed.

In various embodiments, the first and second reactive compositions are epoxy resins, silicone elastomers (e.g., an organopolysiloxane compound having, per molecule, at least two C2-C6 alkenyl radicals bonded to silicon atoms and an organohydrogenpolysiloxane compound having, per molecule, at least two hydrogen atoms bonded to an identical or different silicon atoms), or polyurethanes. Either or both of the first and second reactive compositions may include a catalyst compound and/or a filler compound.

In some embodiments, some or all of the layers are printed using a support material such as a mold. Such a support material may be a UV-curable material, an epoxy acrylate, a urethane acrylate or other acrylated monomer, and/or may include a photoinitiator in an amount of 0.1 to 10% by weight. Also, in other embodiments, the support material may include a photoinitiator for cationic polymerization in an amount of 0.05 to 3% by weight.

A further embodiment of the invention provides a method for fabricating a three-dimensional (3D) object, in which subsequent layers of reactive compositions are repeatedly printed on one another with a laser-enhanced jetting-based 3D printer, wherein the layers are allowed to crosslink with one another between the successive printings of the subsequent layers (e.g., by heating), until the 3D object is formed.

BRIEF DESCRIPTION OF THE DRAWINGS

The accompanying FIG. 1 illustrates a process for fabricating a 3D structure with two (or more) reactive materials in accordance with one embodiment of the invention.

DESCRIPTION

In view of the foregoing limitations of conventional additive manufacturing processes, the present inventors have recognized there remain opportunities to provide improved methods of forming 3D articles as well as opportunities to provide improved materials suitable for 3D printing. Embodiments of the present invention provide methods of forming very accurate 3D articles in materials having a wide range of viscosities, printing more than one material in each layer. The invention advantageously provides jetting of a second material on top of a first one with a large momentum — enough to create a good mixture between the two materials.

The approach to 3D printing provided by the present invention overcomes most, if not all, of the material-related issues mentioned above through the use of laser direct-write (LDW) techniques. In this technique, a laser beam is used to create a patterned surface with spatially-resolved 3D structures by controlled material ablation or deposition. Laser-enhanced jetting is an LDW technique that can be applied in depositing micro-patterns on a surface.

In a laser-enhanced jetting-based system, laser photons provide the driving force to catapult a small volume of material from a donor film toward an acceptor substrate. Typically, the laser beam interacts with the inner side of the donor film, which is coated onto a non-absorbing carrier substrate. The incident laser beam, in other words, propagates through the transparent carrier before the photons are absorbed by the inner surface of the film. Above a certain energy threshold, material is ejected from the donor film toward the surface of the substrate. Examples of laser-enhanced jetting-based printing systems have been described in US Patent Application Publications 2005/0212888 and 2009/0074987, and in WO 2016/020817.

In the present invention, a novel approach for fabricating a 3D structure with two (or more) reactive materials is presented. As illustrated in FIG. 1, in one embodiment this approach (10) includes:
 a. printing a first reactive composition on a substrate with a laser-enhanced jetting-based 3D printer (12);
 b. printing a second reactive composition on the first or previous layer with the said 3D printer to form a subsequent layer (14);
 c. optionally repeating step (b) with independently selected reactive composition for any additional layer needed (16); and
 d. allowing the first and subsequent layers to crosslink, optionally by heating, to obtain an article (18).

This process repeats (20, 22) until the object is formed (24). Optionally, some or all of the layers can be printed using a UV-curable or other support material such as a mold to increase accuracy. Also optionally, post printing curing can be employed to achieve final desired material properties.

In the present invention, several material systems can be used to manufacture the 3D structure:
 1. Silicone Elastomers
 Silicone compositions are crosslinkable through addition reactions and comprise the following parts, as explained in detail in WO 2017/044735:
  a. at least one organopolysiloxane compound A comprising, per molecule, at least two C2-C6 alkenyl radicals bonded to silicon atoms,
  b. at least one organohydrogenpolysiloxane compound B comprising, per molecule, at least two hydrogen atoms bonded to an identical or different silicon atom,
  c. at least one catalyst C consisting of at least one metal or compound, from the platinum group,
  d. at least one reinforcing silica filler D,
  e. at least one organopolysiloxane-polyoxyalkylene copolymer E and
  f. at least one crosslinking inhibitor F.

The crosslinking being by heating rapidly enough to create a semi-crosslinked object that can achieve its final properties by post printing heating.

Other relevant publications regarding silicone elastomers for 3D printing are: WO 2017/081028, WO 2017/121733, WO 2018/206689, U.S. Pat. Nos. 4,477,626, and 6,121,368.

2. Epoxy Systems
 Epoxy resins can be cured with a variety of compounds called curing agents which are also known as curatives, hardeners, or converters. Of the many classes/types of curing agents, amines are most widely utilized as curing agents in epoxy matrices for high performance composites. This produces a heteropolymer consisting of epoxy molecules linked together through the reactive sites of the curing agent. Usually when it is stated that an epoxy matrix is amine cured, it is meant that the curing agent(s) are primary amines which may be aromatic, cycloaliphatic (cyclic), or aliphatic primary amines. A primary amine has two active hydrogens that are each capable of reacting with an epoxy group. Most primary amine curing agents that are used have more than one primary amine per molecule so that cross-linking and therefore network development occur. A secondary amine will react with only one epoxy group. The reaction rate of the secondary amine with an epoxy resin is much slower than that of a primary amine.

Some preliminary work in this field can be found in U.S. Pat. No. 9,527,241.

The amine curing agent selection depends on the desired mechanical and physical properties, environmental resistance and mostly viscosity, and pot-life which are not an issue using laser-enhanced jetting-based technology.

3. Support Material
 The support material properties should be:
  a. Very fast curing—UV curable. The overall process time should be as short as possible.
  b. Low shrinkage—high shrinkage materials will produce a mechanical stress on an electrically conductive layer.
  c. Compatible with the chemistry system in use.

One preferred support material that fulfills these conditions is epoxy acrylate. Epoxy acrylates are compounds prepared by reacting epoxides, either glycidyl ethers or cyclohexene oxides, with acrylic acid, that is producing hydroxyacrylates. By way of example, the aromatic, industrially widespread BPA-DGE or epoxyphenol novolaks are reacted to the corresponding hydroxyacrylates. These are available commercially (e.g., from Rahn, BASF, Sartomer, etc.). Common to these products are viscosities of about 500-50,000 Pa s in the undiluted state. For reasons of handling and processing they are generally diluted with a low-viscosity (5-50 mPa s, 25° C.) acrylic monomer, such as 1,6-hexanediol diacrylate (HDDA), trimethylolpropane triacrylate (TMPTA), tripropylene Glycol Diacrylate (TPGDA), and other monomers known to the person skilled in the art. Radiation-induced free-radical curing of such products produces films having good mechanical properties.

The radiation-curable compositions normally include a photoinitiator. The photoinitiator content is preferably from 0.1 to 10% by weight, based in each case on the total amount of the epoxy acrylates. Suitable photoinitiators are known to the person skilled in the art and are also available commercially. Use may be made, for example, of the products available commercially under the name SpeedCure™ by Lambson. In the case of optional hybrid system compositions comprising an oxirane compound, use is additionally made of initiators for photocationic polymerization, which are likewise known to the person skilled in the art. Photoinitiators for cationic polymerization generate strong Bronsted acids when exposed to UV radiation and thereby initiate the polymerization of the epoxide groups. The compositions contain cationic photoinitiators (also available under the same brand name from Lambson) generally in amounts from 0.05 to 3% by weight, based on the epoxy resin component.

Besides the photoinitiators, suitable sensitizers can be used in effective amounts. The compositions are advantageously cured with UV radiation.

Although the preferred material for this application are epoxy acrylates, since they tend to react very quickly, other acrylates such as urethane acrylate, such as Gemoner 4215 from Rahn as well as other acrylated monomers, can also react (cure) rapidly with very low shrinkage and so are suitable for this application.

A good fit between the system and the support can generate a soluble support that is only a structural building block during the 3D printing and can be washed away later. It plays the roll role of a mold during a crosslinking process that could take a relatively long time for thermally reactive systems such as those mentioned above.

4. Polyurethane Systems

The polymeric materials known as polyurethanes form a family of polymers which are essentially different from most other plastics in that there is no urethane monomer and the polymer is almost invariably created during the manufacture of a particular object.

Polyurethanes are made by the exothermic reactions between alcohols with two or more reactive hydroxyl (—OH) groups per molecule (diols, triols, polyols) and isocyanates that have more than one reactive isocyanate group (—NCO) per molecule (diisocyanates, polyisocyanates). For example, a diisocyanate reacts with a diol at relatively low temperatures and the reaction with catalyst can be fast enough to be used in a laser-enhanced jetting-based system. The group formed by the reaction between the two molecules is known as the urethane linkage. It is the essential part of the polyurethane molecule.

5. Other Systems

The use of two reactants separately with a laser-enhanced jetting-based system that can mix them very well creates an opportunity to take advantage in any chemical reaction that starts from a liquid phase and ends in a solid phase and can be separated into two parts. If the reaction at temperatures lower than 200° C. is fast enough after mixing even to get a semi-cured/semi-reacted object (that will be post cured later), then laser-enhanced jetting-based technology can be used.

For that purpose, a material A that can react with material B and will change its properties to at least a semi-cured/semi-solid product C can be used to create a 3D object in accordance with the present invention. In some cases, some catalyst D or filler E can be added to one of the materials or to both. It is important that the viscosity of material A and material B will be low enough to enable a good mixing between the materials — to this point materials up to 10000 cp were used as models and a very good mixing was achieved.

The number of different chemistries that can be used by this approach are numerous. While not necessarily complete, a list of examples of same are:

a. Polycondensation reactions such as polyamides can be produced directly by the laser-enhanced jetting-based method using di-carboxylic acids and di-amines at elevated temperatures (and to some extent, also polyesters using diols instead of amines).

b. Reactions between di-amine and di-acetyl chloride or di-maleic anhydride with a catalyst can form polyimides; a very important family of structural polymers.

Thus, methods of forming 3D articles utilizing two or more reactive materials have been described. In various embodiments, the present methods provide printing of such articles using two or more reactive materials sequentially, mixing them during the printing phase and not before. Accordingly, nozzle clogging and other reaction-related phenomena are overcome. Numerous different reactive materials can be used according to these methods and many 3D objects can be produced over a wide range of material viscosities using different types of post processing.

What is claimed is:

1. A method for fabricating a three-dimensional (3D) object, comprising:
    (a) printing a first reactive composition on a substrate with a laser-enhanced jetting-based 3D printer to form a first layer of the 3D object;
    (b) after formation of the first layer of the 3D object, jetting a second reactive composition towards the first reactive composition contained within the first layer with said laser-enhanced jetting-based 3D printer to form a mixture of the first reactive composition and the second reactive composition;
    (c) allowing the mixture of the first reactive composition and the second reactive composition to chemically react to form a compound; and
    (d) repeating steps (a) — (c) until the 3D object is formed.

2. The method of claim 1, further comprising repeating step (b) with fan additional reactive composition prior to allowing the first reactive composition and the second reactive composition to chemically react.

3. The method of claim 2, wherein the first reactive composition and the second reactive composition are cross-linked by heating.

4. The method of claim 1, wherein the first reactive composition and the second reactive composition are cross-linked by heating.

5. The method of claim 1, wherein some or all of the first reactive composition and the second reactive composition are printed using a support material as a mold.

6. The method of claim 5, wherein the support material is a UV-curable material.

7. The method of claim 5, wherein the support material is an epoxy acrylate.

8. The method of claim 7, wherein the support material includes a photoinitiator in an amount of 0.1 to 10% by weight.

9. The method of claim 5, wherein the support material includes a photoinitiator for cationic polymerization in an amount of 0.05 to 3% by weight.

10. The method of claim 5, wherein the support material is a urethane acrylate or other acrylated monomer.

11. The method of claim 1, further comprising employing post printing curing after the 3D object is formed.

12. The method of claim 1, wherein the first reactive composition and the second reactive composition are silicone elastomers.

13. The method of claim 12, wherein the first reactive composition comprises an organopolysiloxane compound having, per molecule, at least two C2-C6 alkenyl radicals bonded to silicon atoms and the second reactive composition comprises an organohydrogenopolysiloxane compound having, per molecule, at least two hydrogen atoms bonded to an identical or different silicon atoms.

14. The method of claim 13, wherein the chemical reaction is effected by heating with a catalyst including at least one platinum group metal or compound to create a semi-crosslinked object.

15. The method of claim 1, wherein the first reactive composition and the second reactive composition are epoxy resins.

16. The method of claim 1, wherein the first reactive composition and the second reactive composition are polyurethanes.

17. The method of claim 1, wherein either or both of the first reactive composition and the second reactive composition include a catalyst compound.

18. The method of claim 1, wherein either or both of the first reactive composition and the second reactive composition include a filler compound.

* * * * *